United States Patent
Desanti et al.

(10) Patent No.: US 7,609,689 B1
(45) Date of Patent: Oct. 27, 2009

(54) SYSTEM AND METHOD FOR MAPPING AN INDEX INTO AN IPV6 ADDRESS

(75) Inventors: Claudio Desanti, Los Gatos, CA (US); Dinesh G. Dutt, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1437 days.

(21) Appl. No.: 09/964,702

(22) Filed: Sep. 27, 2001

(51) Int. Cl.
*H04L 12/28* (2006.01)
(52) U.S. Cl. .......... 370/389; 370/392; 370/395.52; 370/395.53; 370/395.54; 709/249
(58) Field of Classification Search ............ 370/395.52, 370/395.53, 395.54, 392, 295.52; 709/249, 709/250
See application file for complete search history.

(56) References Cited

U.S. PATENT DOCUMENTS

| | | | |
|---|---|---|---|
| 5,394,402 A | 2/1995 | Ross | |
| 5,742,604 A | 4/1998 | Edsall et al. | |
| 5,920,705 A * | 7/1999 | Lyon et al. | 709/240 |
| 5,938,736 A * | 8/1999 | Muller et al. | 709/243 |
| 5,964,841 A | 10/1999 | Rekhter | |
| 5,991,299 A * | 11/1999 | Radogna et al. | 370/392 |
| 6,014,380 A * | 1/2000 | Hendel et al. | 370/392 |
| 6,085,238 A * | 7/2000 | Yuasa et al. | 709/223 |
| 6,172,980 B1 * | 1/2001 | Flanders et al. | 370/401 |
| 6,269,098 B1 * | 7/2001 | Crayford | 370/389 |
| 6,307,837 B1 * | 10/2001 | Ichikawa et al. | 370/230 |
| 6,347,087 B1 * | 2/2002 | Ganesh et al. | 370/392 |
| 6,389,506 B1 | 5/2002 | Ross et al. | |

(Continued)

FOREIGN PATENT DOCUMENTS

WO   WO 01/26303 A1 *   4/2001

OTHER PUBLICATIONS

Baker, F., "Requirements for IP Version 4 Routers," Network Working Group, Jun. 1995, Request for Comments: 1812.

(Continued)

*Primary Examiner*—Ayaz R Sheikh
*Assistant Examiner*—Andrew C Lee
(74) *Attorney, Agent, or Firm*—Cesari and McKenna LLP

(57) ABSTRACT

A system and method maps Virtual Local Area Network (VLAN) designations to Internet Protocol version 6 (IPv6) site identifiers (IDs), and embeds site IDs into scoped internet addresses in such a way as to facilitate processing by primarily hardware-oriented forwarding tables. A router has a plurality of interfaces for receiving and forwarding packets, and a route processor for making forwarding decisions for received packets. The route processor includes a routing engine, a routing table, a forwarding information base (FIB), a VLAN store and a site ID store. At least some of the router's interfaces are associated with corresponding VLAN IDs, and the site ID store is preconfigured with a mapping of VLAN IDs to site IDs. For IPv6 packets with link-local unicast destination addresses, embedding the VLAN ID associated with the inbound interface into the address, while for packets with site-local unicast destination addresses, using the retrieved VLAN ID as an index to obtain the corresponding site ID, which is then embedded into the address. The modified destination address is then applied to the FIB, which is a forwarding table optimized to permit fast lookups, to derive the outbound interface from which the packet is to be forwarded to reach the destination entity.

29 Claims, 8 Drawing Sheets

U.S. PATENT DOCUMENTS

| | | | | |
|---|---|---|---|---|
| 6,445,709 | B1 * | 9/2002 | Chiang | 370/399 |
| 6,560,236 | B1 * | 5/2003 | Varghese et al. | 370/401 |
| 6,570,875 | B1 * | 5/2003 | Hegde | 370/389 |
| 6,584,106 | B1 * | 6/2003 | Merchant et al. | 370/395.32 |
| 6,633,567 | B1 * | 10/2003 | Brown | 370/395.3 |
| 6,661,787 | B1 * | 12/2003 | O'Connell et al. | 370/389 |
| 6,661,791 | B1 * | 12/2003 | Brown | 370/392 |
| 6,665,297 | B1 * | 12/2003 | Hariguchi et al. | 370/392 |
| 6,674,756 | B1 * | 1/2004 | Rao et al. | 370/395.21 |
| 6,711,171 | B1 * | 3/2004 | Dobbins et al. | 370/400 |
| 6,728,249 | B2 * | 4/2004 | Chang | 370/395.3 |
| 6,779,043 | B1 * | 8/2004 | Crinion | 709/249 |
| 6,788,681 | B1 * | 9/2004 | Hurren et al. | 370/389 |
| 6,798,777 | B1 * | 9/2004 | Ferguson et al. | 370/392 |
| 6,804,234 | B1 * | 10/2004 | Chow | 370/389 |
| 6,862,280 | B1 * | 3/2005 | Bertagna | 370/392 |
| 6,937,574 | B1 * | 8/2005 | Delaney et al. | 370/254 |
| 6,940,814 | B1 * | 9/2005 | Hoffman | 370/235 |
| 6,947,419 | B2 * | 9/2005 | Liu et al. | 370/390 |
| 6,963,567 | B1 * | 11/2005 | Kaniz et al. | 370/392 |
| 6,980,555 | B2 * | 12/2005 | Mar | 370/395.21 |
| 7,046,663 | B1 * | 5/2006 | Temoshenko et al. | 370/390 |
| 7,050,430 | B2 * | 5/2006 | Kalkunte et al. | 370/389 |
| 7,116,679 | B1 * | 10/2006 | Ghahremani | 370/463 |
| 7,149,216 | B1 * | 12/2006 | Cheriton | 370/392 |
| 7,154,889 | B1 * | 12/2006 | Rekhter et al. | 370/392 |
| 2001/0040895 | A1 * | 11/2001 | Templin | 370/466 |
| 2002/0075872 | A1 * | 6/2002 | Ogawa et al. | 370/392 |
| 2002/0196737 | A1 * | 12/2002 | Bullard | 370/231 |
| 2003/0088697 | A1 * | 5/2003 | Matsuhira | 709/238 |
| 2003/0165140 | A1 * | 9/2003 | Tang et al. | 370/393 |

OTHER PUBLICATIONS

Deering and Hinden, "Internet Protocol, Version 6 (IPv6) Specification," Network Working Group, Dec. 1995, Request for Comments: 1883.

Hinden, et al., "An IPv6 Aggregatagble Global Unicast Address Format," Network Working Group, Jul. 1998, Request for Comments: 2374.

Newman, et al., "Ipsilon Flow Management Protocol Specification for IPv4 Version 1.0," Network Working Group, May 1996, Request for Comment: 1953.

Rekhter and Li, "An Architecture for IPv6 Unicast Address Allocation," Network Working Group, Dec. 1995, Request for Comments: 1887.

Catalyst 2820 Series and Catalyst 1900 Series Enterprise Edition Software Configuration Guide, Chapter 2: Virtual LANs, pp. 2-1 through 2-49.

"Draft Standard P802.1Q/D10 IEEE Standards for Local and Metropolitan Area Networks: Virtual Bridged Local Area Networks," Mar. 22, 1998, Institute of Electrical and Electronics Engineers, Inc., New York.

"White Paper, Catalyst 8500 CSR Architecture," Cisco Systems, Inc., Jul. 2, 2000.

Ran Atkinson, "(IPng 1061) Forwarding Link-local Addresses," Cisco Systems, Inc., Sep. 1996.

Brian Haberman, "Routing of Site-Scoped Addresses in the Internet Protocol Version 6 (IPv6)," IBM, Internet Draft, Apr. 1998.

Cisco Express Forwarding Feature Module, Cisco Systems, Inc., 1998.

White Paper: Cisco Express Forwarding (CEF), Cisco Systems, Inc., Jul. 3, 2000.

Overview of Routing Between Virtual LANs, Cisco Systems, Inc., 1997.

Next Generation IP, Morgan Kaufmann Publishers, 1997.

* cited by examiner

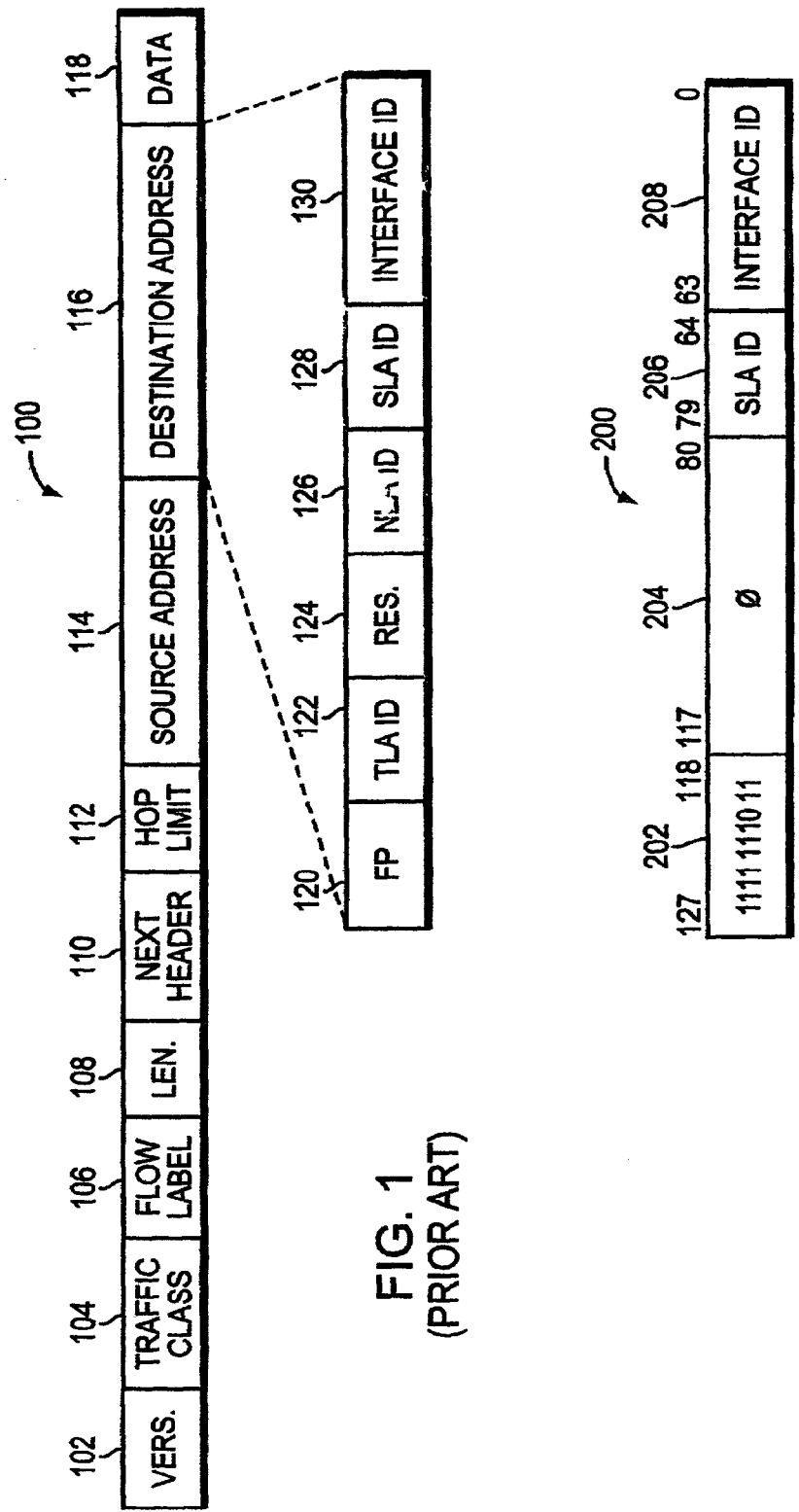

SYSTEM AND METHOD FOR MAPPING AN INDEX INTO AN IPV6 ADDRESS

BACKGROUND OF THE INVENTION

1. Field of the Invention

This invention relates to computer networks and, more specifically, to the making of forwarding decisions for network messages.

2. Background Information

Computer networks typically comprise a plurality of interconnected entities. An entity may consist of any device, such as a computer or end station, that "sources" (i.e., transmits) or "sinks" (i.e., receives) datagrams (e.g., packets and/or frames). A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or internet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" or interconnection function for transferring information between a plurality of LANs or end stations. Bridges and switches may operate at various levels of the communication protocol stack. For example, a switch may operate at layer 2 which, in the Open Systems Interconnection (OSI) Reference Model, is called the data link layer and includes the Logical Link Control (LLC) and Media Access Control (MAC) sublayers. Data frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto the destination port(s) associated with that MAC destination address. Ports used to couple switches to each other are generally referred to as a "trunk" ports, whereas ports used to couple switches to LANs or end stations are generally referred to as "access" ports.

Other network devices, commonly referred to as routers, may operate at higher communication layers, such as layers 3, 4 or even higher. Layers 3 and 4 of Transmission Control Protocol/Internet Protocol (TCP/IP) networks correspond to the IP and TCP/User Datagram Protocol (UDP) layers, respectively. Data packets or frames at the IP layer also include a header that contains an IP source address and an IP destination address. Routers or layer 3 switches may re-assemble or convert received data frames from one LAN standard (e.g., Ethernet) to another (e.g. token ring). Thus, layer 3 devices are often used to interconnect dissimilar subnetworks. Many equipment manufacturers include both layer 2 switching and layer 3 routing functions in a single device.

Virtual Local Area Networks

A computer network may also be segregated into a series of logical network segments. U.S. Pat. No. 5,394,402, issued Feb. 28, 1995 (the "'402 patent"), for example, discloses an arrangement for associating any port of a switch with any particular segregated network group. Specifically, according to the '402 patent, any number of physical ports of a particular switch may be associated with any number of groups within the switch by using a virtual local area network (VLAN) arrangement that virtually associates the port with a particular VLAN designation. These VLAN designations are also associated with the messages that are received on these ports. In particular, every time a message is received on a given access port, the VLAN designation for that port, as stored in a memory portion of the bridge, is associated with the message. For convenience, each VLAN designation is often associated with a different color, such as red, blue, green, etc.

In many cases, it may be desirable to interconnect a plurality of these switches in order to extend the VLAN associations of ports in the network. By extending VLAN associations across multiple devices, those entities having the same VLAN designation function as if they are all part of the same LAN segment. Message exchanges between parts of the network having different VLAN designations are specifically prevented in order to preserve the boundaries of each VLAN segment or domain. In addition to the '402 patent, the Institute of Electrical and Electronics Engineers (IEEE) has promulgated the 802.1Q specification standard for Virtual Bridged Local Area Networks. The IEEE's 802.1Q standard supports VLANs and defines a specific VLAN-tagged message format for transmission on trunks.

IPv6

Although it has performed well, several deficiencies have been identified with the is current version of the Internet Protocol (IPv4). One of the primary deficiencies is the limited number of available addresses. Specifically, IPv4 provides for 32-bits addresses. IPv4 addresses are expected to be exhausted in the next few years. As a result, work has been ongoing to develop a replacement to IPv4, known as Internet Protocol version 6 or IPv6.

FIG. 1 is a highly schematic block diagram of an IPv6 packet 100 which includes a plurality of fields. In particular, the IPv6 packet 100 includes a version field 102, a traffic class field 104, a flow label field 106, a payload length field 108, a next header field 110, and a hop limit field 112. The IPv6 packet 100 further includes a source address (SA) field 114, a destination address (DA) field 116 and a variable length data field 118. The SA and DA fields 114, 116 are each 128-bits in length. That is, while IPv4 defined 32-bit address spaces, IPv6 has 128-bits address spaces, substantially increasing the number of available IP addresses.

Several address types or formats have been defined for IPv6. Request for Comments (RFC) 2374, for example, defines so-called Aggregatable Global Unicast Addresses. The DA field 116 of FIG. 1 illustrates an Aggregatable Global Unicast Address, which includes a 3-bits format prefix (FP) field 120, which is set to binary "001", a 13-bits Top-Level Aggregation (TLA) Identifier (ID) field 122, an 8-bits reserved field 124 to accommodate the growth in TLA IDs, a 24-bits Next-Level Aggregation (NLA) ID field 126, a 16-bits Site-Level Aggregation (SLA) ID field 128, which is similar to a subnet ID in IPv4, and a 64-bits interface ID field 130.

IPv6 also defines two types of local use or scoped unicast addresses: link-local unicast addresses and site-local unicast addresses. In contrast to the Aggregatable Global Unicast Addresses described above, link-local and site-local addresses are not globally unique. Instead, link-local addresses are unique only on a single link, while site-local addresses are unique only within a given site. Link-local addresses were developed to support auto-configuration, while site-local addresses were developed, at least in part, to allow computer networks that are not connected to the global Internet to nonetheless use IPv6 address schemes. A site, which is not rigorously defined in IPv6, is typically intended to cover a region of topology that belongs to a single organization and that is located within a particular geographic location. A link typically refers to a LAN or a bridged network.

FIG. 2 is a highly schematic block diagram of an IPv6 site-local unicast address 200. The site-local unicast address 200 includes a 10-bits prefix 202, which is set to binary "1111 1110 11", to identify the address as a site-local unicast address. The prefix 202 is located at higher order bit positions 118 to 127, which may be represented by the notation <127: 118>. The site-local unicast address 200 further includes a 38-bits intermediary field 204 which is set to null (i.e., all zeros), a 16-bit Site-Level Aggregation (SLA) Identifier (ID) field 206, which is similar to field 128 (FIG. 1) and a 64-bits interface ID field 208, which is similar to field 130 (FIG. 1), and is at bit positions <63:0>.

Link-local unicast addresses have a similar format as site-local unicast addresses except that the prefix is set to binary "1111 1110 10". Also, link-local unicast addresses do not include a SLA field. Instead, all of the bit positions between the prefix and the interface ID field are set to null.

Intermediate devices, such as routers, must only forward packets containing site-local addresses on outbound interfaces that are associated with the same site as the interface on which the packet was received. This is due, at least in part, to the fact that entities located within different sites may nonetheless be using the same interface ID values. Packets carrying link-local destination addresses are not meant to be forwarded by layer 3 (L3) devices at all, other than back out the logical interface on which they were received.

In the Internet Draft document entitled *Routing of Site-Scoped Addresses in the Internet Protocol Version 6* (IPv6), dated April 1998, the author proposes the creation of a plurality of routing tables to forward site-local addresses. In particular, an intermediate network device whose interfaces are coupled to n different sites establishes n+1 routing tables; one for global addresses and one for each of the n sites. To forward a packet containing a site-local destination address, the router accesses the routing table associated with the site on which the packet was received and, if there is a match, forwards the packet on the identified outbound interface. This approach, however, as recognized in the Internet Draft document itself, increases protocol processing time, thereby reducing the efficiency of the intermediate device. Accordingly, a need exists for a system capable of forwarding scoped addresses efficiently.

SUMMARY OF THE INVENTION

Briefly, the invention relates to a system and method that utilizes Virtual Local Area Network (VLAN) designations as Internet Protocol version 6 (IPv6) link identifiers, and that also maps VLAN designations to IPv6 site identifiers (IDs). The system may also embed VLAN designations into link-local unicast addresses and site IDs into site-local unicast addresses in a manner that facilitates processing by forwarding components configured for high-speed operation. The invention is preferably implemented at an intermediate network device, such as a router, having a plurality of interfaces for receiving and forwarding network messages, such as packets, and a route processor for making forwarding decisions for received packets. The route processor includes a routing engine, a routing table, a forwarding information base (FIB), a VLAN store and a site ID store. The router's interfaces, moreover, are preferably associated with VLAN designations. The site ID store is preconfigured with a mapping of VLAN designations to site IDs. In particular, each VLAN designation is mapped to just one site ID, but more than one VLAN designation may be mapped to the same site ID.

Upon receiving a packet carrying a link-local or site-local unicast destination address, the routing engine retrieves the VLAN designation associated with the interface on which the packet was received (i.e., the inbound interface). If the destination address is a site-local unicast address, the routing engine then uses the retrieved VLAN designation as an index to obtain the corresponding site ID of the inbound interface. For link-local uni-cast destination addresses, the routing engine may embed the VLAN designation into the address, while for site-local unicast addresses, the routing engine may embed the site ID therein. The modified destination address is then applied to the FIB, which is a forwarding table optimized to permit fast lookups, to derive the outbound interface from which the packet is to be forwarded to reach the destination entity. In accordance with the present invention, the FIB is preprogrammed with link-local and site-local unicast addresses or address prefixes that have already been modified to include the correct VLAN designation or site ID embedded therein. After deriving the outbound interface, the routing engine then checks to see whether the source address of the packet is a link-local or a site-local unicast address. If it is, the routing engine makes a check that the VLAN designation (for link-local unicast source addresses) or the site ID (for site-local unicast source addresses) corresponding to the inbound interface matches the VLAN designation or the site ID corresponding to the outbound interface. If there is a match, the packet is forwarded. If the two do not match, the packet is dropped.

BRIEF DESCRIPTION OF THE DRAWINGS

The invention description below refers to the accompanying drawings, of which:

FIGS. 1 and 2, previously discussed, are block diagrams of a conventional network message and address format;

DETAILED DESCRIPTION OF AN ILLUSTRATIVE EMBODIMENT

Figure 3:
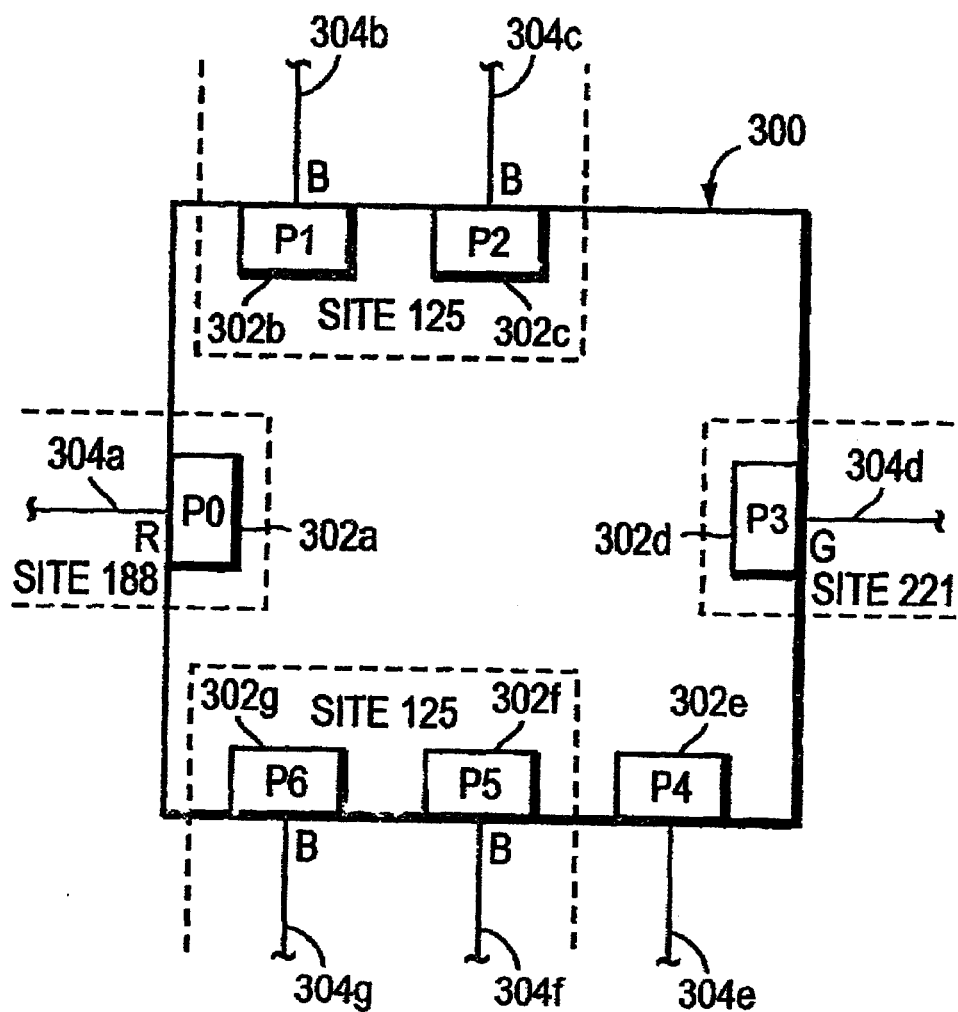
FIG. 3 is a highly schematic block diagram of an intermediate network device in accordance with the present invention.

FIG. 3 is a highly schematic illustration of an intermediate network device 300 in accordance with the present invention. Device 300 includes a plurality of interfaces or ports 302a-g from which network messages can be received and forwarded. Each port, moreover, may be identified by a corresponding port identifier, e.g., P0-P6. Coupled to each port 302a-g is a respective link 304a-g. As described herein, device 300 is configured to forward network messages, e.g., packets and/or frames, originated by a source entity and received by the device 300 on a first port, e.g., P1, onto a second port, e.g., P5 for receipt by a destination entity.

Device 300 is preferably disposed within a computer network (not shown), and each port or interface of device 300 may be associated with a Virtual Local Area Network (VLAN) designation or identifier (ID) defined within the network. For example, port 302a or P0, which is an access port, is associated with the red (R) VLAN ID, ports 302b, 302c, 302f and 302g, which are also access ports, are each associated with the blue (B) VLAN ID, and port 302d or P3, which is another access port, is associated with the green (G) VLAN ID. As indicated above, access ports are typically coupled directly to LANs and/or end stations. When a network message, such as a packet or frame, is received on an access port, the port's VLAN ID is associated with the message.

Port 302e or P4, which is a trunk port, is not associated with a VLAN ID. As indicated above, trunk ports are typically coupled to links which interconnect intermediate network devices and carry messages belonging to many different VLANs. A network message forwarded on or received from a trunk port is generally tagged with the VLAN ID associated with the message. In this way, the VLAN ID associated with a message received on a trunk port is readily and unambiguously apparent. Trunk ports, such as port 302e, may be configured to operate in accordance with any number of VLAN tagging or encapsulation protocols, such as the IEEE 802.1Q Virtual Bridged Local Area Networks Protocol specification standard or the Interswitch Link (ISL) mechanism from Cisco Systems, Inc., as described in U.S. Pat. No. 5,742,604, which is hereby incorporated by reference in its entirety.

In some situations, a trunk port may be configured to support a "native VLAN". A native VLAN refers to the VLAN designation associated with all untagged messages received on the trunk port, i.e., with all untagged messages traversing the respective link.

The association of ports to VLAN IDs is preferably accomplished in a conventional manner. For example, a network administrator may make the associations working either locally or remotely from device 300. Additionally or alternatively, the device 300 may participate in the Generic Attribute Registration Protocol (GARP) VLAN Registration Protocol (GVRP). With GVRP, intermediate devices, end stations, hosts, servers, workstations, etc. can issue and revoke declarations regarding their membership in specific VLANs. In addition to GVRP, VLAN membership information may be distributed through the VLAN Trunk Protocol (VTP), which is described in the IEEE 802.1s Multiple Spanning Trees Draft Supplement. Additionally, ports 302 may be configured to operate in accordance with any number of VLAN encapsulation protocols, such as the IEEE 802.1Q standard or the Inter-Switch Link (ISL) mechanism from Cisco Systems, Inc. of San Jose, Calif., as described in U.S. Pat. No. 5,742,604.

The term intermediate network device is intended broadly to cover any intermediate device for interconnecting end stations of a computer network, including, without limitation, layer 3 (L3) devices or routers, as defined by Request for Comments (RFC) 1812 from the Internet Engineering Task Force (IETF), intermediate devices that are fully or only partially compliant with RFC 1812, intermediate devices operating above L3, intermediate devices that provide additional functionality, such as Virtual Local Area Network (VLAN) support, IEEE 802.1Q support and/or IEEE 802.1D support, etc. Intermediate network device also includes layer 2 intermediate devices, such as switches and bridges, including, without limitation, devices that are fully or partially compliant with the IEEE 802.1D standard and intermediate devices that provide additional functionality, such as VLAN support, IEEE 802.1Q support and/or IEEE 802.1p support, Asynchronous Transfer Mode (ATM) switches, Frame Relay switches, etc.

A suitable platform for router 300 is the Catalyst 6000, the Catalyst 6500 or the Cisco 7500 series of routers from Cisco Systems, Inc.

Figure 4:
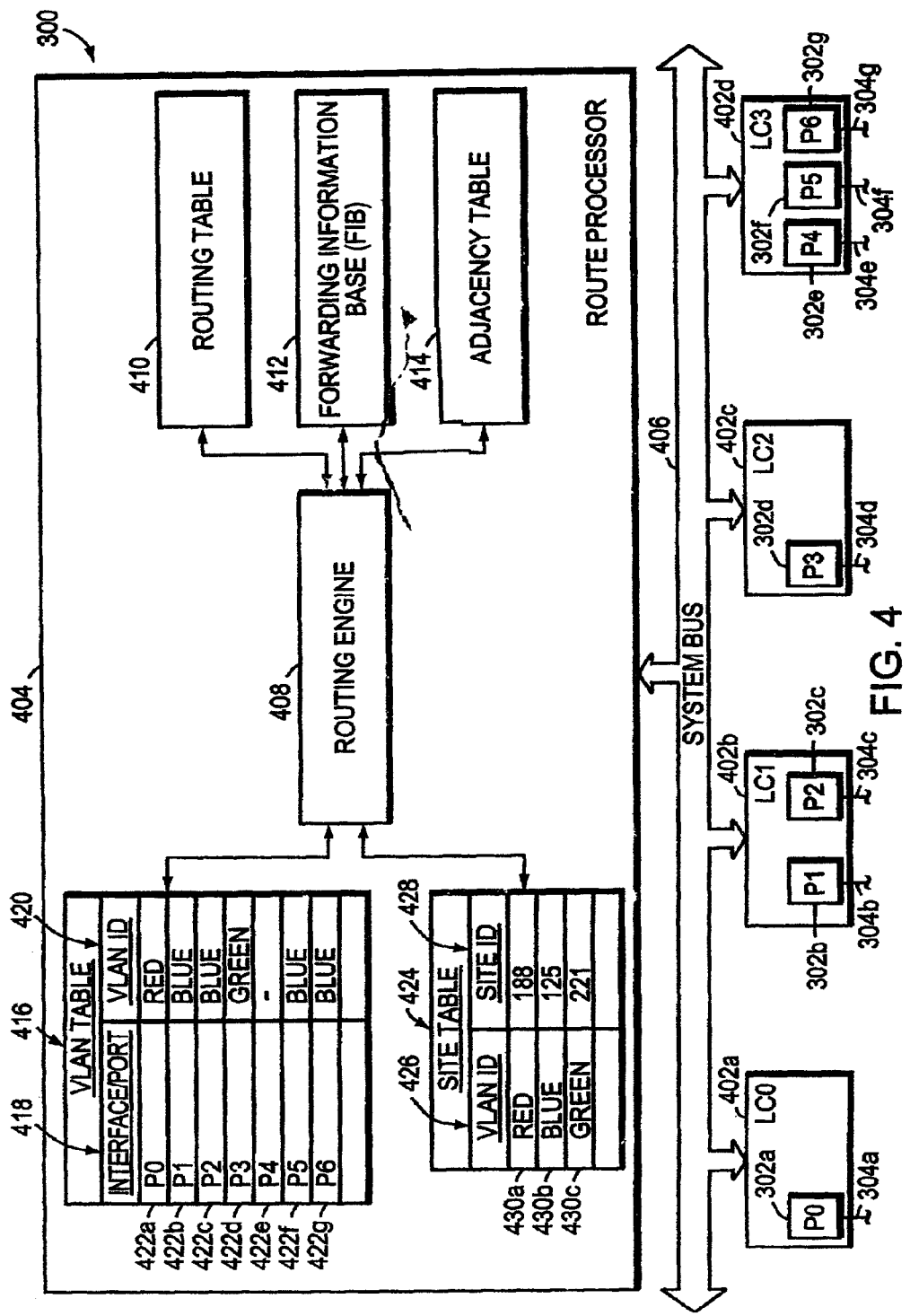
FIG. 4 is a highly schematic, partial block diagram of the intermediate network device of FIG. 3 in greater detail.

FIG. 4 is a partial block diagram of intermediate device 300 in greater detail. Device 300 includes a plurality of line cards 402a-d, which may be identified as LC0-3, and a route processor 404. The route processor 404 and line cards 402a-d are preferably in communicating relationship by one or more communication structures, such as system bus 406. Accordingly, packets or portions thereof can be exchanged among the lines cards and the route processor. The route processor 404 preferably includes a routing engine 408, a routing table 410, a forwarding information base (FIB) 412 and an adjacency table 414.

The FIB 412, like the routing table 410, contains forwarding information or routes through the computer network. The routing table 410 is suitably configured and arranged so that searches may be performed primarily through software, such as by Longest Prefix matching routines. The FIB 412 is suitably configured and arranged to permit lookups at a faster rate than can otherwise be performed by the routing table 410. The ability to perform at least some searches more quickly typically improves the performance of the route processor 404 by generating routing decisions for specific packets faster than can often be done with a routing table alone. The adjacency table 414 contains the Layer 2 (L2) addresses, e.g., Media Access Control (MAC) addresses, of nodes, e.g., intermediate network devices, that are adjacent to device 300, as well as the output ports and VLAN IDs (in the case of trunk ports) to be used to reach those devices. A node is considered adjacent to device 300 if it can be reached in a single hop.

It should be understood that intermediate device 300 may be configured to have a decentralized or distributed forwarding architecture. In this case, each line card 402a-d is provided with its own router processor, which is similar to route processor 404. Routing decisions, i.e., for packets received by the ports of a single line card, can be performed by the local route processor, thereby improving performance. Each route processor disposed on the line cards preferably operates in the same manner as described herein in connection with route processor 404.

As described above, a plurality of VLAN designations have been established within the computer network within which device 300 is disposed, and each port 302 of device 300 that is configured as an access port may be associated with a VLAN ID. Other ports may be configured as trunk ports. In the preferred embodiment, the route processor 404 includes or has access to a VLAN table 416. The VLAN table 416 is preferably organized, at least logically, as a table array having a plurality of columns and rows whose intersections define cells or records for storing information. In particular, the VLAN table 416 has an interface or port column 418, a VLAN ID column 420 and a plurality of rows 422a-g. A separate row 422 is preferably established for each interface or port configured at device 300. The cells corresponding to column 420 contain the VLAN ID associated with the respective interface or port. For example, as shown by the contents of the cell of row 422f corresponding to column 420, port P5 is associated with the blue (B) VLAN ID. Row 422e instead shows that port P4 is a trunk port.

In addition to the VLAN designations, the computer network within which device 300 is disposed may also be organized to include one or more sites so as to support IPv6 site-local addresses. Each site, moreover, may have a corresponding site identifier (ID), and the boundaries of these sites may be arranged to pass through the intermediate devices disposed within the network, including device 300.

In accordance with the present invention, the VLAN designations that have been established within the computer network are mapped to site IDs. A VLAN can be mapped and thus belong to only one site. The site ID, moreover, which identifies the site itself, is local to each intermediate network device. Within each device, each VLAN ID, as indicated above, is mapped to only one site ID, although multiple VLAN IDs may be mapped to the same site ID. In other words, each site ID is mapped to a VLAN group and each VLAN group may have one or more VLAN designations as members. In the preferred embodiment, the mapping of VLAN IDs to site IDs is performed by a network administrator configuring the respective device, i.e., device 300. In particular, the network administrator first associates the device's physical network ports with respective VLAN IDs. The network administrator then assigns within the device one or more VLAN IDs to some locally established site IDs. The network administrator may use a conventional Command Line Interface (CLI) terminal or window or some other terminal or window in order to configure the respective device. The network administrator may also accomplish the configuring of site IDs remotely using a configuration protocol, such as the Simple Network Management Protocol (SNMP).

The results of this configuration process are preferably stored at a table, such as site table 424, which may be disposed at or is at least accessible by the route processor 404. Site table 424 is also organized, at least logically, as a table array having a plurality of columns and rows whose intersections define cells for storing data. In particular, site table 424 has a VLAN ID column 426, a site ID column 428 and a plurality of rows 430a-c. A separate row 422 is preferably established for each VLAN ID configured at device 300. The cells corresponding to column 428 contain the site ID value to which the VLAN ID of the respective row has been assigned. As shown, the red VLAN ID is mapped to site ID "188", the blue VLAN ID is mapped to site ID "125", and the green VLAN ID is mapped to site ID "221".

In operation, the routing engine 408 of device 300 utilizes the information in routing table 410, FIB 412 and adjacency table 414 to make forwarding decisions for network messages, e.g., packets and/or frames, received on ports 302a-g. Furthermore, routing engine 408 uses the information in the VLAN table 416 and the site table 424 in cooperation with the structure and organization of the FIB 412 and the adjacency table 414 to ensure that link-local and site-local unicast IPv6 addresses are not forwarded beyond the respective link or outside of the respective site, as the case may be.

Figure 5A:
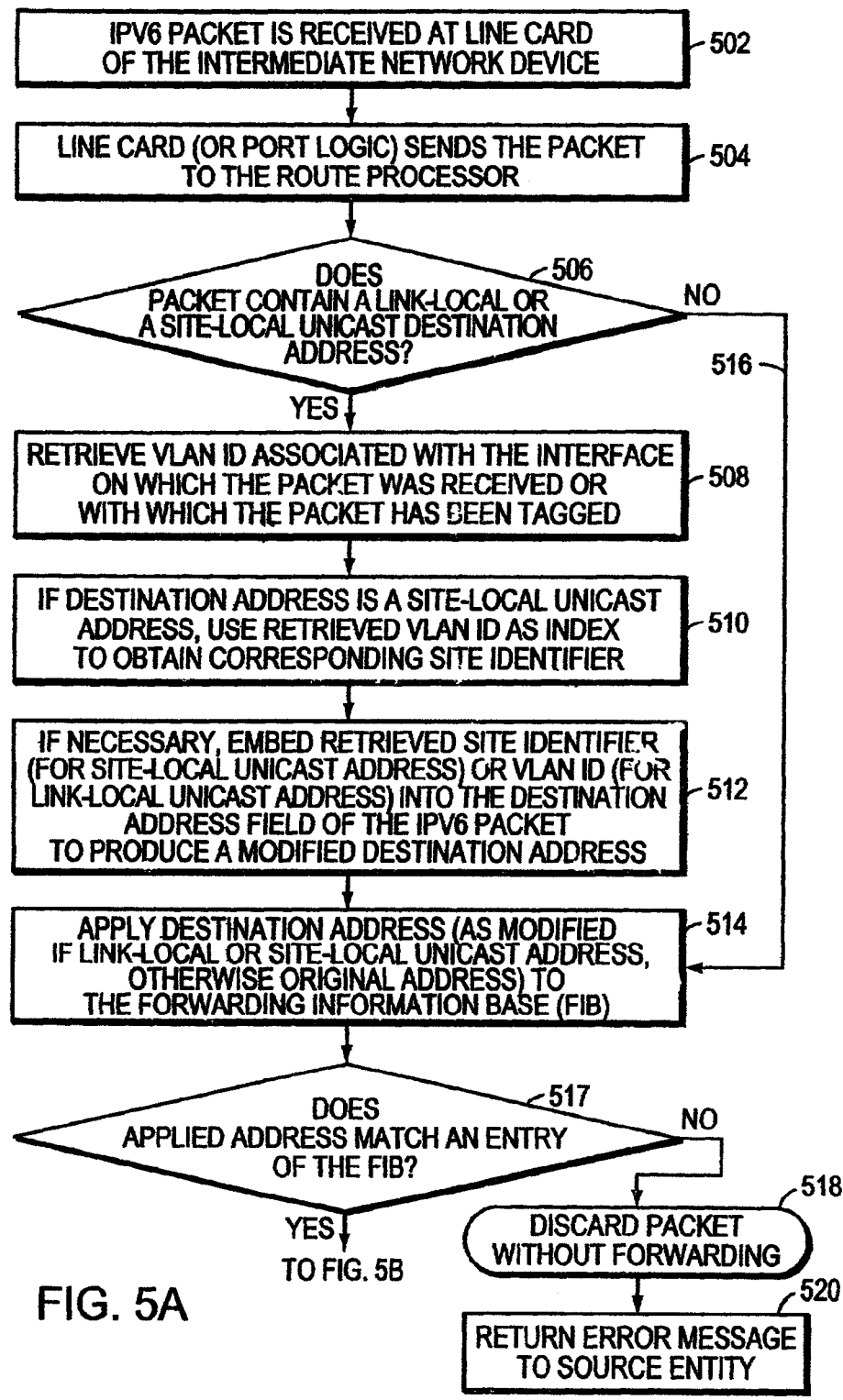
FIGS. 5A-C is a flow diagram of a preferred method in accordance with the present invention.
Figure 5B:
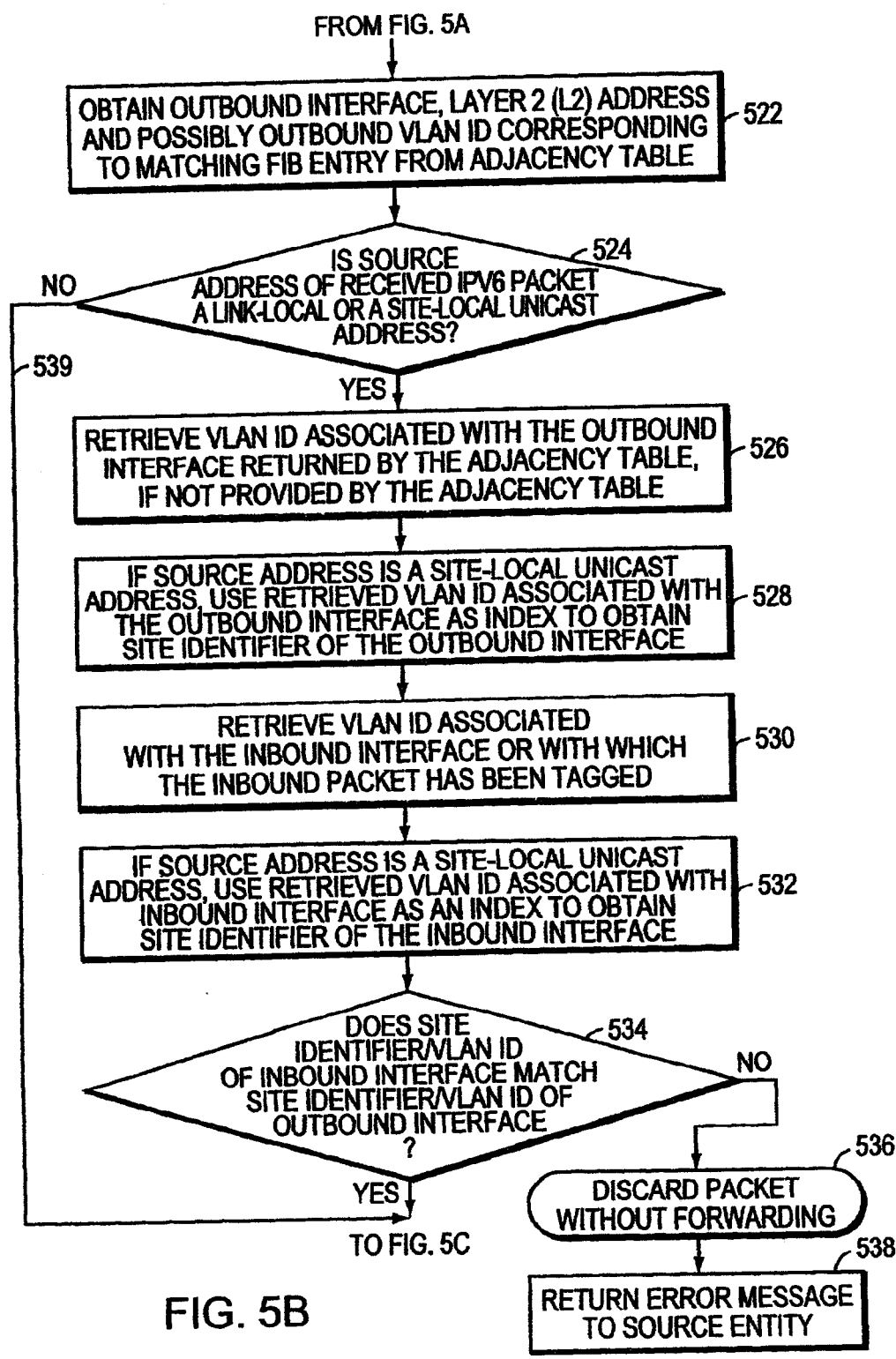
Figure 5C:
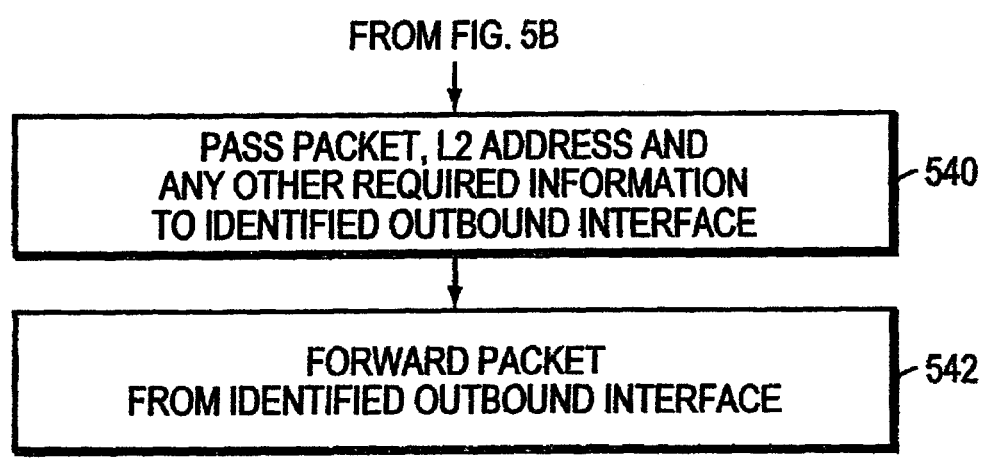

FIGS. 5A-C is a flow diagram of a method in accordance with the present invention. Suppose, for example, that device 300 receives a network message, i.e., a packet 100 (FIG. 1) in conformance with the IPv6 specification standard, on port 302c, as indicated at block 502 (FIG. 5A). The line card 402b passes the received message 100 or a portion thereof to the route processor 404 along with the port on which it was received so that route processor 404 can make a forwarding decision, as indicated at block 504. In a distributed forwarding architecture, port logic sends the packet to the local route processor. The routing engine 408 first examines the contents of the destination address field 116 to see whether it contains a link-local or a site-local unicast IPv6 address, as indicated at decision block 506. That is, the routing engine 408 determines whether the first 10-bits of the destination address are either binary "1111 1110 10", indicating that the address is a link-local unicast address, or "1111 1110 11", indicating that the address is a site-local unicast address. If so, the routing engine 408 retrieves the VLAN ID associated with the port, i.e., port 302c, on which the packet was received, as indicated at block 508. Specifically, the routing engine 408 preferably performs a look-up on the VLAN ID table 416 using the port number, i.e., P2, of the port on which the packet 100 was received. In this case, the routing engine 408 determines that the message 100 was received on a port associated with the blue (B) VLAN ID. In the case of a network message received on a trunk port, the VLAN ID is retrieved from the message itself which has been tagged with the respective VLAN ID, as also indicated at block 508.

If the destination address is a site-local address, the routing engine 408 then uses the retrieved VLAN ID to retrieve or derive the corresponding site ID of the inbound interface, as indicated at block 510. More specifically, the routing engine 408 uses the retrieved VLAN ID, i.e., blue, as an index into site table 424 to locate the matching entry, i.e., row 430b. The routing engine 408 then accesses the cell that corresponds to column 428 in order to obtain the corresponding site ID value, i.e., "125". Next, depending on the manner by which the FIB 412 is implemented as described below, the routing engine 408 may embed the retrieved VLAN ID or site ID into the link-local or the site-local unicast destination address, respectively, thereby generating a modified destination address, as indicated at block 512. In accordance with the illustrative embodiment, both the VLAN ID values and the site ID values are each 12-bits in length, and the retrieved value is loaded into bit positions <107:96> of the IPv6 packet's destination address.

Figure 6:
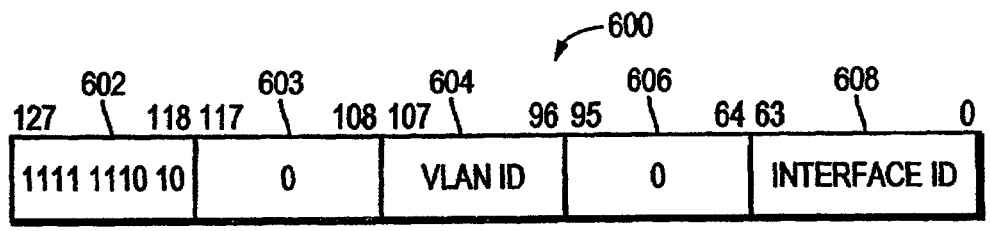
FIG. 6 is a highly schematic block diagram of a link-local unicast IPv6 scoped address as modified in accordance with the present invention.

FIG. 6 is a highly schematic illustration of a link-local IPv6 unicast destination address 600 that has been modified to include, within the address itself, the VLAN ID value associated with the port on which the respective packet was received. Modified link-local destination address 600 has a plurality of fields, including a 10-bits prefix 602, which is set to binary "1111 1110 10", a 10-bits field 603 set to null (i.e., all zeros), and a 12-bits VLAN ID field 604, which is preferably located at bit positions <107:96> of the address 600. It should be understood that the VLAN ID of the inbound interface is embedded at a location of the link-local unicast address which is otherwise set to null or zero. The modified link-local unicast address 600 further includes a 32-bits field 606 which is set to null, and a 64-bits interface ID field 608. It should be understood that the contents of fields 602, 603, 606 and 608 of the modified link-local unicast address 600 are the same as the original link-local unicast address received by the route processor 404 from the line card.

Figure 7:
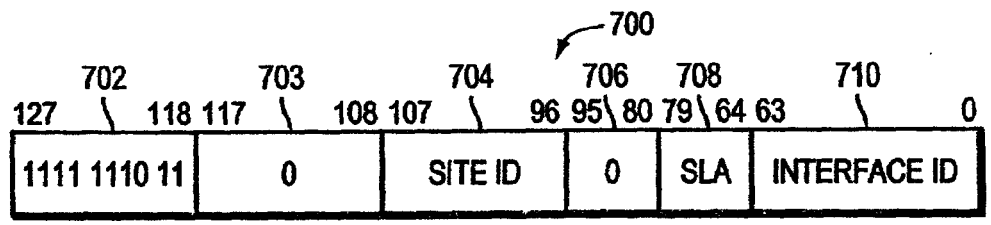
FIG. 7 is a highly schematic block diagram of a site-local unicast IPv6 scoped address as modified in accordance with the present invention.

FIG. 7 is a highly schematic illustration of a site-local IPv6 unicast destination address 700 that has been modified to include, within the address itself, the site ID value associated with the port on which the respective packet was received. The modified site-local unicast destination address 700 also has a plurality of fields, including a 10-bits prefix 702, which in this case is set to binary "1111 1110 11", and a 10-bits field 703 set to null (i.e., all zeros). The modified destination address 700 further includes a 12-bits site ID field 704, which is preferably located at bit positions <107:96> of the address 700. It should be understood that the site ID is also embedded at a location of the site-local unicast address which is otherwise set to null or zero. The modified destination address 700 further includes a 16-bits field 706 which is set to null, a 16-bits SLA ID field 708, and a 64-bits interface ID field 710. It should be understood that the contents of fields 702, 703, 706, 708 and 710 of the modified site-local unicast address 700 are the same as the original site-local unicast address received by the route processor 404 from the line card.

Once it has generated the modified link-local or site-local unicast destination address 600, 700, the routing engine 408 then applies the modified destination address to the FIB 412 in order to render a forwarding decision for the message 100, as indicated at block 514 (FIG. 5A). Returning to decision block 506, if the destination address of the received packet is not a link-local or site-local unicast address, e.g., it is a globally unique IPv6 address, then the original destination address is simply applied to the FIB 412, as indicated by No arrow 516 leading from decision block 506 directly to block 514. Upon applying the modified or original destination address to the FIB 412, the routing engine 408 determines whether the applied address matches one of the FIB's entries, as indicated at decision block 517.

Figure 8:
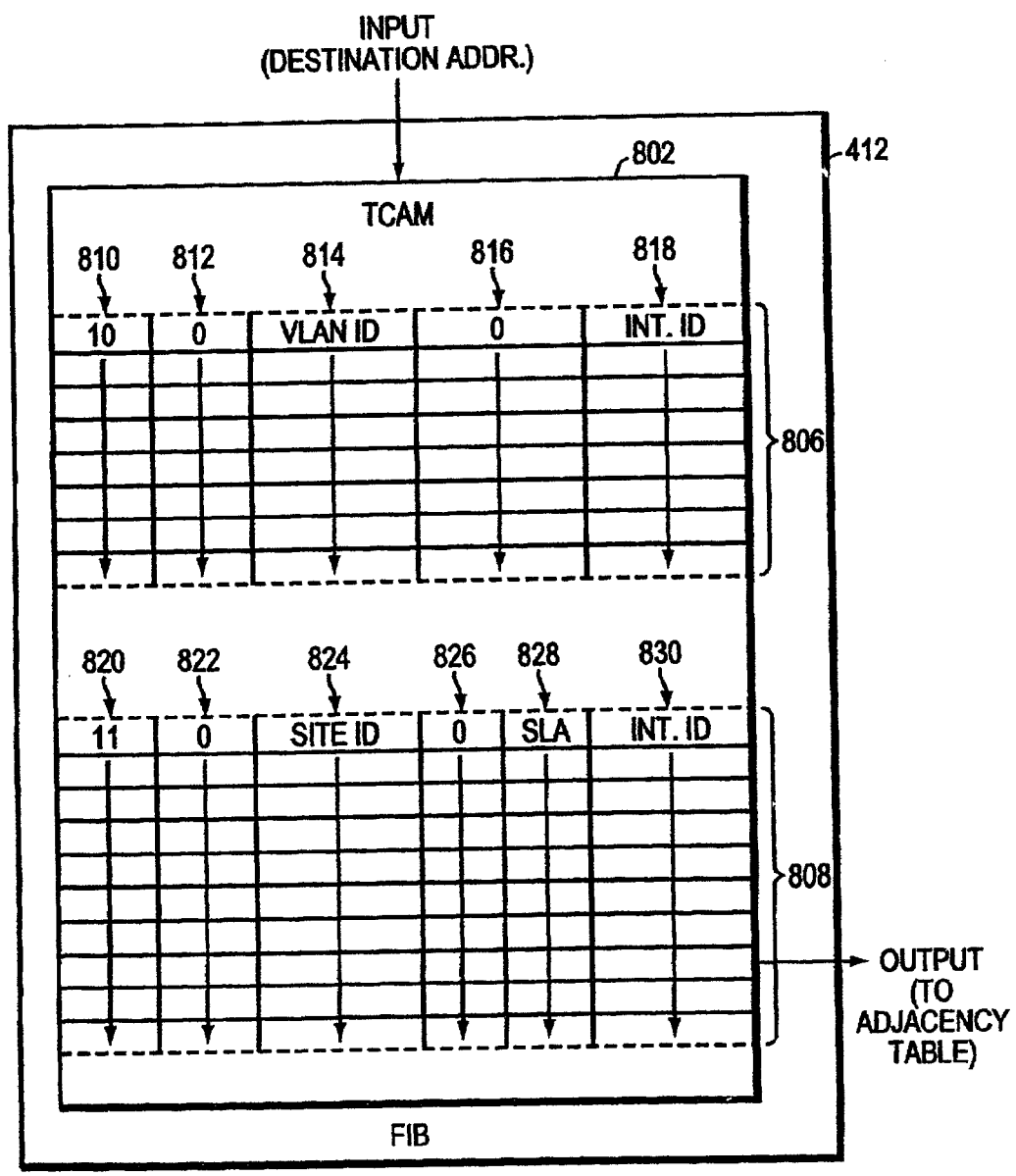
FIG. 8 is a highly schematic block diagram of a forwarding information base (FIB) configured in accordance with the present invention.

FIG. 8 is a highly schematic block diagram illustrating a preferred organization and structure of the FIB 412. The FIB 412 preferably comprises one or more ternary content addressable memories (TCAMs), such as TCAM 802. Each row or entry of the TCAM 802 has a plurality of cells that are associated with or assigned one of three possible values, "0", "1" or "don't care", and stores a respective IPv6 address or address prefix. A preferred TCAM 802 has 512K rows each having a length of 144-bits, which is sufficient to accommodate 128-bit IPv6 addresses. To implement the "don't care" value, the TCAM 802 may be segregated into blocks of cells (each cell being either asserted or de-asserted) and a corresponding mask applied to determine whether the particular cells of its block are "care" or "don't care". Each row of the TCAM 802 also specifies a pointer to a respective row or entry of the adjacency table 414 (FIG. 4) which is used to store information related to the contents of the matching TCAM entry.

A suitable TCAM for use with the present invention is described in co-pending U.S. patent application Ser. No. 09/130,890, filed Aug. 7, 1998, now issued as U.S. Pat. No. 6,389,506, which is hereby incorporated by reference in its entirety. Other suitable TCAMs are commercially available from NetLogic Microsystems, Inc. of Mountain View, Calif. and Music Semiconductors of Hackettstown, N.J.

In accordance with the invention, the TCAM 802 and the adjacency table 414 are preprogrammed with routing information from routing table 410. More specifically, as indicated above, each row of the TCAM 802 is programmed with an IPv6 address or address prefix while each row of the adjacency table 414 is programmed with the outbound interface to be used by device 300 in order to reach the destination address of the corresponding TCAM entry plus other information. If the outbound interface is a trunk port, then the VLAN ID that is to be used by device 300 in tagging the message is also programmed into the adjacency table 414. In other words, the TCAM 802 contains globally unique, site-local and link-local unicast addresses or address prefixes. In addition, the site-local and link-local unicast addresses or address prefixes programmed into the TCAM 802 include the correct site ID or VLAN ID embedded therein.

The TCAM 802 may be programmed in such a way that one or more sections of the TCAM, such as section 806, contains link-local unicast addresses, while another section, such as section 808, contains site-local unicast addresses. Each section 806 and 808 is formed from a contiguous set of rows of the TCAM 802. As shown, each row of the TCAM 802 within section 806 has a first field 810 set to binary "1111 1110 10" (represented in the drawing as "10" for clarity), a second field 812 set to null, a third field 814 set to a particular VLAN ID value, a fourth field 816 also set to null, and a fifth field 818 set to a particular interface ID value. Each row of the TCAM 802 within section 808 has a first field 820 set to binary "1111 1110 11" (represented in the drawing as "11" for clarity), a second field 822 set to null, a third field 824 set to a particular site ID value, a fourth field 826 also set to null, a fifth field 828 set to a particular SLA value and sixth field 830 set to a particular interface ID value.

It should be understood that by utilizing a TCAM, one or more of these fields or some portion thereof can be set to "don't care". This can be especially advantageous when the TCAM stores address prefixes.

The FB 412 is preferably preprogrammed by the routing engine 408 based on the information stored at the routing table 410, which can be populated manually by the network administrator or automatically by using the particular routing protocol implemented by the routing engine 408, such as the well-known Open Shortest Path First (OSPF) routing protocol. The routing table 410 can also be populated with VLAN and site ID information either manually or automatically, and this information, in turn, can be used to program the FIB 412. Alternatively, the routing engine 408 can obtain the VLAN and site ID information from other sources, such as separate tables.

As indicated above, a destination address (either modified or in original form) is applied to the TCAM 802, and the routing engine 408 determines whether there is a matching entry. If not, the routing engine 408 discards the packet, as indicated at block 518 (FIG. 5A), and may return an error message, such as an Internet Control Message Protocol (ICMP) message, to the source entity, informing it that the destination entity cannot be reached, as indicated at block 520.

If the destination address applied to the TCAM 802 matches an entry contained therein, the routing engine 408 obtains the corresponding outbound interface and layer 2 (L2) address, as indicated at block 522 (FIG. 5B). As described above, each TCAM entry, which contains an IPv6 address, preferably identifies a corresponding entry in the adjacency table 414. This corresponding entry includes the interface to which the packet 100 should be passed for forwarding to reach the intended recipient, the L2 address of the neighboring device and, if the output interface is configured as a trunk port, the VLAN ID with which to tag the forwarded packet.

It should be understood that a modified link-local unicast address will only match a TCAM entry if the VLAN ID value of the modified address corresponds to the VLAN ID value programmed into the respective TCAM entry, assuming a match also exists on the other fields. Similarly, a modified site-local unicast address will only match a TCAM entry if the site ID value of the modified address corresponds to the site ID value programmed into the respective TCAM entry.

After obtaining the identifier of the outbound interface from the adjacency table 414, the routing engine 408, in accordance with the preferred embodiment, must also determine whether the source address of the IPv6 packet is a link-local or a site-local unicast address, as indicated at decision block 524. If so, the routing engine 408 obtains the VLAN ID associated with the outbound interface returned by the adjacency table 414, as indicated at block 526. If the outbound interface is a trunk port, then the VLAN ID is returned by the adjacency table 414. If the source address is a site-local unicast address, the routing engine 408 uses the VLAN ID retrieved for the outbound interface as an index into site table 424 in order to obtain the site ID for the outbound interface, as indicated at block 528. Next, the routing engine 408 retrieves the VLAN ID from VLAN table 416 associated with the interface on which the packet was received or from the message itself, in the case of a message received on a trunk port, as indicated at block 530. At block 532, the routing engine 408 obtains the site ID for the VLAN ID of the inbound interface if the source address is a site-local unicast address.

It should be understood that if the destination address of the packet was a link-local or a site local unicast address, the routing engine already obtained the VLAN ID associated with the inbound interface at block 508 (FIG. 5A). Thus, a VLAN ID is only retrieved at block 530 for packets carrying a globally unique destination address. Similarly, for site-local unicast destination addresses, step 532 was already performed at block 510 (FIG. 5A).

For link-local unicast source addresses, the routing engine then compares the VLAN ID associated with the inbound interface with the VLAN ID associated with the outbound interface to see if they match, as indicated at decision block 534. For site-local unicast source addresses, the routing engine 408 compares the site IDs of the inbound and outbound interfaces to see if they match, at decision block 534. If the two compared values do not match, then the packet 100 cannot be forwarded as either the two VLAN IDs or the two site IDs are not the same. In response, the routing engine 408 discards the packet 100, as indicated at block 536, and may return an error message to the sourcing entity, as indicated at block 538.

If the two VLAN IDs or the two site IDs match or if the source address, as evaluated at decision block 524, was not a link-local or a site local unicast address as indicated by No arrow 539, which by-passes steps 526-538, then the routing engine 408 uses the information retrieved from the adjacency table 414 (such as the L2 address) in forwarding the packet 100, as indicated at block 540 (FIG. 5C). In particular, routing engine 408 passes the packet 100 and the L2 address to the respective line card, e.g., line card 402d, as also indicated at block 540. The packet 100 is then forwarded from the identified interface, i.e., port 302g, in a conventional manner, as indicated at block 542.

As shown, according to the present invention, packets carrying link-local destination addresses can be forwarded by device 300 beyond the link on which they are received. Specifically, packets with link-local addresses can be forwarded from any outbound interface so long as the VLAN designation of the outbound interface matches the VLAN designation of the inbound interface. Furthermore, it should be recognized that the check on the source address of received packets is important whenever the destination address has a greater scope than the source address, such as a packet having a link-local or a site-local unicast source address and a global destination address, or a packet having a link-local unicast source address and a site-local unicast destination address.

It should be understood that site IDs and VLAN IDs may be longer or shorter than 12-bits.

It should also be understood that the FIB 412 may further include a random access memory (RAM) for each TCAM 802. Each TCAM entry, moreover, may identify a corresponding entry of the corresponding RAM at which the respective outbound interface is stored. The returned outbound interface could then be used to perform a look-up on the adjacency table which would only include L2 addresses in order to obtain the corresponding L2 address. Those skilled in the art will understand that other arrangements are also possible. For example, the FIB 412 may include other hardware components in place of or in addition to the TCAM(s), such as content addressable memories (CAMs).

The FIB 412 can also be implemented in software designed to permit at least some forwarding decisions to be performed at high speed as compared to the routing table. Because a software implemented FIB does not have the width constraints of a CAM or TCAM implementation, site and link identifiers need not be embedded within the destination address as indicated by the "if necessary" language of step 512 (FIG. 5A). CAMs or TCAMs of sufficient width could be also employed thereby eliminating the need to embed site and link identifiers. Alternatively, the FIB 412 may also be implemented through some combination of software and hardware components.

It should be further understood that the null fields or areas of the IPv6 link-local and site-local unicast destination addresses may be omitted from the respective TCAM entries so as to conserve space within the TCAM. In this case, the null fields or areas would similarly be omitted from the addresses being applied to the TCAM.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for use by an intermediate network device having a plurality of interfaces for forwarding network packets among the interfaces, one or more of the interfaces being associated with one or more Virtual Local Area Network (VLAN) designations, the method comprising the steps of:

mapping, by a routing processor, each VLAN designation to an Internet Protocol version 6 (IPv6) site identifier in a table;

receiving, on an inbound interface, a packet having an IPv6 site-local unicast destination address in a field of a header;

identifying the VLAN designation associated with the received packet;

utilizing the identified VLAN designation to retrieve the IPv6 site identifier to which the VLAN designation is mapped;

creating a modified destination address by embedding the retrieved IPv6 site identifier into the IPv6 site-local unicast destination address; and rendering a forwarding decision for the received packet based on the modified destination address.

2. The method of claim 1 wherein the step of rendering a forwarding decision comprises the step of deciding upon an outbound interface from which the packet is to be forwarded.

3. The method of claim 2 wherein the packet further includes an IPv6 site-local unicast source address, the method further comprising the steps of:

identifying the VLAN designation associated with the outbound interface from which the packet is to be forwarded or the VLAN designation with which the packet is to be tagged;

utilizing the identified VLAN designation for the outbound interface to retrieve the IPv6 site identifier to which the VLAN designation is mapped; and comparing the IPv6 site identifier associated with the inbound interface with the IPv6 site identifier associated with the outbound interface.

4. The method of claim 3 further comprising the steps of:

if, as a result of the comparing step, the two IPv6 site identifiers match, forwarding the packet on the outbound interface; and if, as a result of the comparing step, the two IPv6 site identifiers do not match, dropping the packet without forwarding.

5. The method of claim 1 wherein the step of rendering comprises the step of applying the modified destination address to a forwarding information base (FIB) optimized to permit fast lookups.

6. The method of claim 5 wherein the FIB includes one or more content addressable memories (CAMs) and/or ternary content addressable memories (TCAMs).

7. The method of claim 6 wherein the one or more CAMs and/or TCAMs stores addresses or address prefixes that have been modified to include IPv6 site identifiers embedded therein.

8. The method of claim 7 wherein at least one of the CAMs and/or TCAMs has a plurality of rows and each row of the CAM and/or TCAM stores a respective address or address prefix.

9. The method of claim 1 wherein
the IPv6 site-local unicast address has one or more areas set to null, and
the IPv6 site identifier is embedded at a selected null area of the address.

10. The method of claim 1 whereby each VLAN designation is mapped to a single IPv6 site identifier.

11. The method of claim 10 whereby a plurality of VLAN designations are mapped to the same IPv6 site identifier.

12. The method of claim 1 wherein
packets may be one of either untagged or tagged with a VLAN designation, and
the step of identifying includes either, if the received packet is untagged, determining the VLAN designation of the inbound interface on which the untagged packet was received or, if the received packet is tagged, determining the VLAN designation with which the received packet is tagged.

13. A method for use by an intermediate network device having a plurality of interfaces for forwarding network packets among the interfaces, one or more of the interfaces being associated with one or more Virtual Local Area Network (VLAN) designations, the method comprising the steps of:
mapping, by a routing processor, each VLAN designation to an Internet Protocol version 6 (IPv6) site identifier in a table;
receiving on an inbound interface a packet having an IPv6 site-local unicast destination address in a field of a header;
identifying the VLAN designation associated with the received packet;
utilizing the identified VLAN designation to retrieve the IPv6 site identifier to which the VLAN designation is mapped; and
creating a modified destination address by embedding the retrieved IPv6 site identifier into the IPv6 site-local unicast destination address.

14. The method of claim 13 wherein the packet further includes an IPv6 site-local unicast source address, the method further comprising the steps of:
identifying the VLAN designation associated with the outbound interface from which the packet is to be forwarded or the VLAN designation with which the packet is to be tagged;
utilizing the identified VLAN designation for the outbound interface to retrieve the IPv6 site identifier to which the VLAN designation is mapped; and comparing the IPv6 site identifier associated with the inbound interface with the IPv6 site identifier associated with the outbound interface.

15. The method of claim 14 further comprising the steps of:
if, as a result of the comparing step, the two IPv6 site identifiers match, forwarding the packet on the outbound interface; and
if, as a result of the comparing step, the two IPv6 site identifiers do not match, dropping the packet without forwarding.

16. An intermediate network device for forwarding packets within a computer network, the device comprising:
a plurality of interfaces for receiving and forwarding packets, one or more of the interfaces associated with one or more virtual local area network (VLAN) designations;
a forwarding information base (FIB) for storing routing information;
a routing engine in communicating relationship with the FIB, the routing engine configured to make forwarding decisions for received packets, based at least in part on the routing information in the FIB; and
a memory in communicating relationship with the routing engine, the memory configured to store the VLAN designations associated with the device's interfaces in mapping relationship with one or more Internet Protocol version 6 (IPv6) site identifiers,
wherein the routing engine identifies the VLAN designation associated with the received packet, utilizes the identified VLAN designation to retrieve the IPv6 site identifier to which the VLAN designation is mapped, and creates a modified destination ad-dress by embedding the retrieved IPv6 site identifier into an IPv6 site-local unicast destination address, and
wherein the routing engine utilizes the memory to ensure that a packet having an IPv6 site-local unicast source and/or destination address is only forwarded between inter-faces corresponding to the same IPv6 site identifier.

17. The intermediate network device of claim 16 wherein the FIB includes one or more content addressable memories (CAMs) and/or ternary content addressable memories (TCAMs) programmed with a plurality of addresses or address prefixes.

18. The intermediate network device of claim 17 wherein at least one CAM and/or TCAM has a width that is equal to or greater than 128 bits.

19. The intermediate network device of claim 16 wherein the routing engine:
renders a forwarding decision for the received packet based on the modified destination address.

20. The intermediate network device of claim 19 wherein the routing engine prevents packets received on an inbound interface that corresponds to a first IPv6 site identifier from being forwarded on an outbound interface that corresponds to a second IPv6 site identifier.

21. The intermediate network device of claim 16 wherein
the plurality of interfaces are located at one or more line cards disposed at the intermediate network device, and
each line card includes a corresponding FIB and routing engine for rending forwarding decisions.

22. A method for use by an intermediate network device having a plurality of interfaces for forwarding network packets among the interfaces, one or more of the interfaces being associated with one or more Virtual Local Area Network (VLAN) designations, the method comprising the steps of:

receiving on an inbound interface a packet having an Internet Protocol version 6 (IPv6) link-local unicast destination address in a field of a header;

identifying the VLAN designation associated with the received packet;

creating a modified destination address by embedding the identified VLAN designation into the IPv6 link-local unicast destination address; and rendering a forwarding decision for the received packet based on the modified destination address.

23. The method of claim 22 wherein the step of rendering a forwarding decision comprises the step of deciding upon an outbound interface from which the packet is to be forwarded.

24. The method of claim 23 wherein the packet further includes a link-local unicast source address, the method further comprising the steps of:

identifying the VLAN designation associated with the outbound interface from which the packet is to be forwarded; and comparing the VLAN designation associated with the inbound interface with the VLAN designation associated with the outbound interface.

25. The method of claim 24 further comprising the steps of:

if, as a result of the comparing step, the two VLAN designations match, forwarding the packet; and if, as a result of the comparing step, the two VLAN designations do not match, dropping the packet without forwarding.

26. The method of claim 22 wherein packets may be one of either untagged or tagged with a VLAN designation, and the step of identifying includes either, if the received packet is untagged, determining the VLAN designation of the inbound interface on which the untagged packet was received or, if the received packet is tagged, determining the VLAN designation with which the received packet is tagged.

27. An intermediate network device for forwarding packets within a computer network, the intermediate device comprising:

means for mapping, by a routing processor, one or more VLAN designations to an Internet Protocol version 6 (IPv6) site identifier in a table;

means for receiving a packet having an IPv6 site-local unicast destination address in a field of a header;

means for identifying a particular VLAN designation associated with the received packet;

means for retrieving the IPv6 site identifier to which the particular VLAN designation is mapped;

means for creating a modified destination address by embedding the retrieved IPv6 site identifier into the IPv6 site-local unicast destination address; and means for rendering a forwarding decision for the received packet based on the modified destination address.

28. A computer readable medium containing computer-executable program instructions for forwarding packets within a computer network, the computer-executable program instructions comprising computer-executable program instructions configured to:

map, by a routing processor, one or more VLAN designations to an Internet Protocol version 6 (IPv6) site identifier in a table;

identify a particular VLAN designation associated with a received packet that has an IPv6 site-local unicast destination address in a field of a header;

retrieve the IPv6 site identifier to which the particular VLAN designation is mapped;

create a modified destination address by embedding the retrieved IPv6 site identifier into the IPv6 site-local unicast destination address; and render a forwarding decision for the received packet based on the modified destination address.

29. An apparatus comprising:

a plurality of interfaces configured to receive and forward packets, one or more of the interfaces associated with one or more virtual local area network (VLAN) designations;

a forwarding information base (FIB) configured to store routing information;

a routing engine in communicating relationship with the FIB, the routing engine configured to make forwarding decisions for received packets, based at least in part on the routing information in the FIB; and a memory in communicating relationship with the routing engine, the memory configured to store the VLAN designations associated with the device's interfaces in mapping relationship with one or more Internet Protocol version 6 (IPv6) site identifiers, wherein the routing engine is further configured to, in response to receipt of a packet on an inbound interface having an IPv6 site-local unicast destination address in a field of a header, identify a VLAN designation associated with an outbound interface from which the packet is to be forwarded, utilize the identified VLAN designation for the outbound interface to retrieve an IPv6 site identifier to which the VLAN designation is mapped, creating a modified destination address by embedding the retrieved IPv6 site identifier into the IPv6 site-local unicast destination address, compare an IPv6 site identifier associated with an inbound interface with the IPv6 site identifier associated with the outbound interface, and if the two IPv6 site identifiers match, forward the packet on the outbound interface, and if the two IPv6 site identifiers do not match, drop the packet without forwarding.

* * * * *

UNITED STATES PATENT AND TRADEMARK OFFICE
CERTIFICATE OF CORRECTION

PATENT NO. : 7,609,689 B1  
APPLICATION NO. : 09/964702  
DATED : October 27, 2009  
INVENTOR(S) : Claudio Desanti Page 1 of 1

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 2311 days.

Col. 2, Line 23, should read mulgated[[ to]] the 802.1Q specification standard for Virtual Col. 2, Line 29, should read been identified with the[[ is]] current version of the Internet Col. 6, Line 10, should read 402*a-d*, which may be identified as[[ LCO-3]] LC0-3, and a route pro- Col. 10, Line 12, should read The[[ FB]] FIB 412 is preferably preprogrammed by the routing Signed and Sealed this Twentieth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,609,689 B1 | |
| APPLICATION NO. | : 09/964702 | |
| DATED | : October 27, 2009 | |
| INVENTOR(S) | : Claudio Desanti et al. | |

It is certified that error appears in the above-identified patent and that said Letters Patent is hereby corrected as shown below:

This certificate supersedes the Certificate of Correction issued on July 20, 2010 that contained a typographical error in the patent number. The patent number was incorrectly listed as 7,609,681 in the heading of the issued cofc. The corrections in the July 20, 2010 Certificate of Correction that belonged to Patent No. 7,609,689 are as follows:

On the Title Page:

The first or sole Notice should read --

Subject to any disclaimer, the term of this patent is extended or adjusted under 35 U.S.C. 154(b) by 2311 days.

Col. 2, Line 23, should read mulgated[[ to]] the 802.1Q specification standard for Virtual Col. 2, Line 29, should read been identified with the[[ is]] current version of the Internet Col. 6, Line 10, should read 402*a-d*, which may be identified as[[ LCO-3]] LC0-3, and a route pro- Col. 10, Line 12, should read The[[FB]] FIB 412 is preferably preprogrammed by the routing Signed and Sealed this
Fifteenth Day of February, 2011

David J. Kappos
*Director of the United States Patent and Trademark Office*